Feb. 6, 1923.

M. B. COVERT.
CLUTCH CONE.
FILED JUNE 4, 1921.

1,444,168

Inventor:
MARTIN B. COVERT.
by B. S. Watts
Attorney.

Patented Feb. 6, 1923.

1,444,168

UNITED STATES PATENT OFFICE.

MARTIN B. COVERT, OF INDIANAPOLIS, INDIANA.

CLUTCH CONE.

Application filed June 4, 1921. Serial No. 474,889.

*To all whom it may concern:*

Be it known that I, MARTIN B. COVERT, a citizen of the United States, and a resident of Indianapolis, county of Marion, State of Indiana, have invented certain new and useful Improvements in Clutch Cones, of which the following is a specification.

This invention is concerned with clutches for power transmitting mechanism and is especially applicable to cone clutches of the type employed in motor vehicles driven by internal combustion engines.

One object of the invention is to construct a clutch cone which will be light in weight and extremely easy to operate.

Another object is to construct a clutch cone of sheet metal which will be capable of retaining its original size and shape against distorting forces set up during its rotation and removal from engagement with the cooperating clutch member.

Another object is to construct a thin sheet metal clutch cone provided with a reinforcing ring secured to its periphery.

Another object is to construct a new and improved clutch cone brake.

Other objects and the particular construction and corelation of parts by which all the objects are attained will be pointed out hereinafter.

Heretofore, in power transmitting mechanism, the driven cone of a cone clutch has been made of either cast or sheet metal. The cast metal cones perform satisfactorily, but are thick and heavy and not entirely suitable where light weight is desired. Consequently, sheet metal cones have, to some extent, supplanted the cast metal cones, largely because of the lighter weight which correspondingly decreased the weight of the whole clutch mechanism. In the case of motor vehicles such decreased weight was a decided advantage.

I have discovered, however, that a still further and very important advantage, not previously known or obtained, can be had in sheet metal cones of proper construction.

The ordinary sheet metal cone is subjected, during rotation, to strong centrifugal forces and to other influences which cause it to distort. When a cone clutch is being rotated at a high rate, as 2000 revolutions per minute, or more, considerable centrifugal force is exerted on the peripheral portions thereof. Such force may be and actually is enough to cause outward movement of the periphery of the thin sheet metal cone. Altho such force would normally be substantially equal in all directions, small variations in thickness or weight of certain portions or a slight whipping action, due to eccentric mounting of the cone on its shaft, or even a little vibration in the shaft itself, may tend to localize these forces. The result then is a distortion of the cone periphery and a change in it from a circle to a substantial ellipse, as is shown by dotted lines in Figs. 2 and 3.

It is also possible that pulling the hub or central portion of the cone against the clutch springs in retracting the cone causes distortion of the periphery of the cone which would probably take place about as illustrated in Figs. 2 and 3.

Small inequalities in thicknesses of the clutch lining, as well as other factors, may also contribute to the cause or extent of distortion of the thin metal cone.

Whenever, for any or all of these or other reasons, the periphery of the cone is distorted, portions of it press so tightly against the clutch lining that considerable effort is required to retract the cone in disengaging the clutch members. Failure, previously, to take into consideration the probability of distortion of sheet metal cones has, therefore, prevented the obtaining of full advantage of the light weight, the only advantage actually enjoyed from their use being that a saving of a few pounds in weight.

A cone embodying my invention, on the other hand, possesses the previously obtained advantages of lightness and also, due to its rigidity and resistance to distortion, the new and important advantage of extreme ease of operation. Since it does not distort, when rotated or retracted, it may be withdrawn from engagement with the other clutch member by a force sufficient only to overcome that of the clutch springs. To illustrate, it has been found that, if a force of about 48 lbs. on the foot pedal is required to disengage an ordinary sheet metal cone, rotating at about 2000 revolutions per minute, only about 12 lbs. is needed to similarly move my improved cone.

This extreme ease of operation I attribute to suitably strengthening the cone whereby it becomes substantially rigid and capable of resisting any strains tending to distort it.

In the drawings attached hereto and forming a part of this specification, I have disclosed my invention as embodied in the power transmitting mechanism of a motor vehicle.

Figures 1, 2, 3:
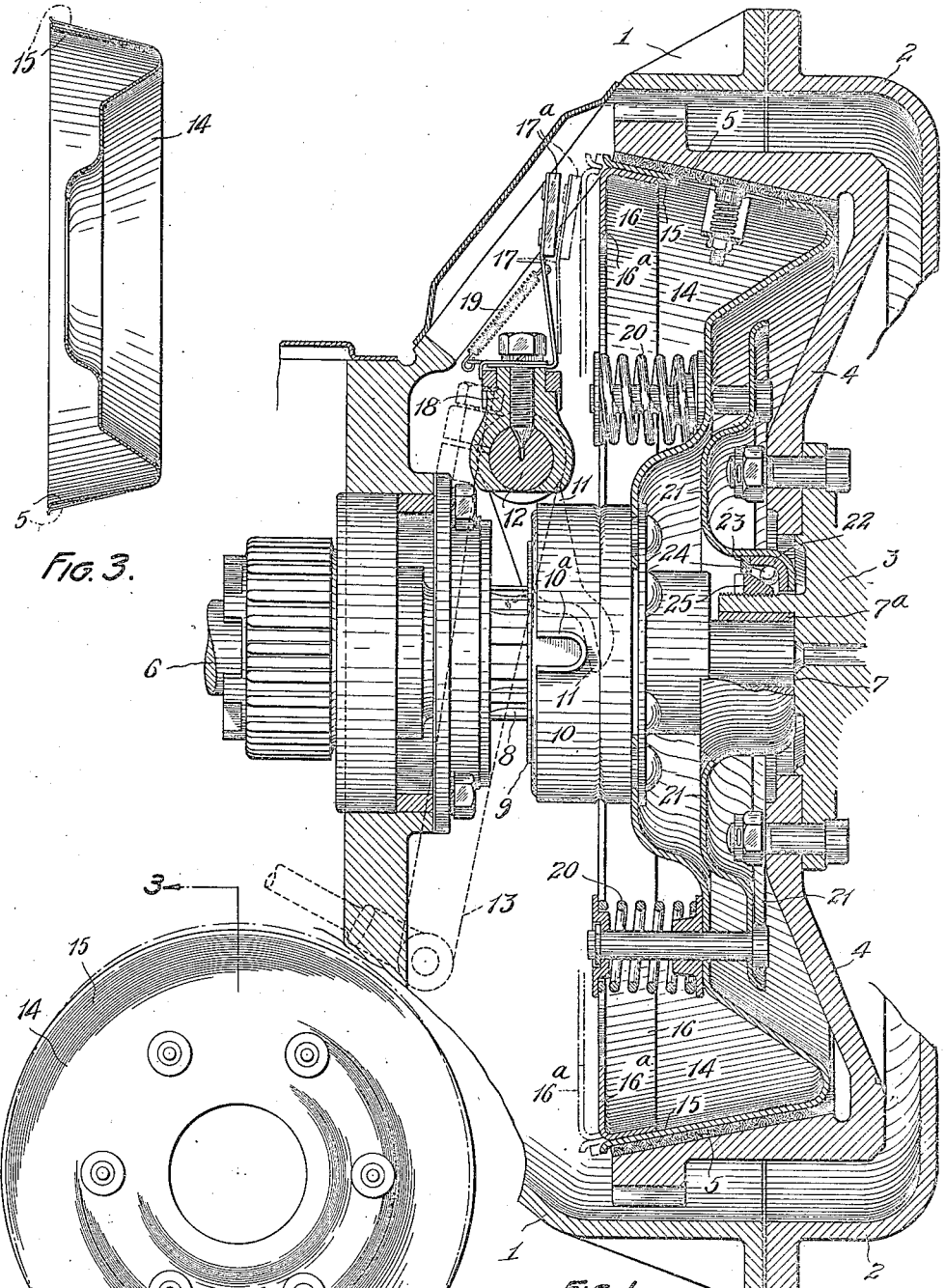
Figure 1 is a vertical view, partly in section, of a cone clutch embodying my invention.
Fig. 2 is a rear end elevation of an ordinary sheet metal cone, showing, greatly exaggerated, the distortion of the cone when subjected to centrifugal and other distorting forces.
Fig. 3 is a section taken on line 3—3 of Fig. 2, showing how the distortion of the peripheral portion of the cone may be distributed thereover.

1 designates a hollow transmission case or housing secured to the rear end of an internal combustion engine 2. A crank shaft 3, projecting into this space enclosed by the housing and engine, carries an ordinary cast metal fly wheel 4. The rear side of this fly wheel is provided with a conical surface to which is attached the usual clutch lining 5.

A shaft 6, rotatably mounted in case 1 in alignment with crank shaft 3, has its forward end supported in a bushing 7ᵃ located in opening 7 in the end of shaft 3. Splines 8 on the shaft serve to permit movement of sleeve 9 on the shaft but prevent independent rotational movement of the shaft and sleeve.

Means for moving sleeve 9 lengthwise of shaft 6 comprises a ball race (not shown) provided with a cover 10 rotatably mounted on sleeve 9, arms 11 engaging with cover 10 and secured to shaft 12 and a lever 13 for actuating the latter. Movement of the lever causes rotation of shaft 12, bringing arms 11 into contact with projections 10ᵃ on cover 10 and resulting in movement of sleeve 9 along shaft 6.

14 designates a thin sheet metal clutch cone, attached to sleeve 9 and having its outer peripheral portion 15 conformable as to size and shape with the conical surface of fly wheel 4. To strengthen this portion and prevent deformation of it, I preferably secure to it a reinforcing ring 16 by welding, riveting or otherwise. This ring may, and perferably does, have an inwardly extending portion or flange 16ᵃ which, in addition to rendering ring 16 quite rigid and capable of resisting distortional strains set up during use, affords a braking surface upon which brake 17 may bear. This brake comprises a sheet metal plate 17 provided at one end with suitable brake lining material 17ᵃ and secured at its other end to a saddle 18 which is keyed to shaft 11. Rotation of this shaft to move sleeve 9 rearwardly on shaft 6 and thus retract cone 14 from engagement with fly wheel 4, simultaneously tilts plate 17 forwardly into engagement with flange 16ᵃ of cone 16. A small coil spring 19 serves to prevent vibration and humming of brake 17.

Cone 15 is maintained in engagement with fly wheel 4 by a series of compression springs 20 which press against the rear side of the cone and which are secured to a sheet metal disc 21 rotatably mounted on shaft 3. This disc has a cup-like ball race 22 and plate 23 pressed into its central or hub portion to carry bearings 24 and lubricant therefor. A nut 25, having a tapered surface, furnishes the other necessary race for bearings 24.

Since springs 20 are normally under compression, disc 21 maintains cone 14 in contact with fly wheel 4 except when the cone is retracted by lever 13 and arms 11.

Altho I have chosen to illustrate my invention by an embodiment suitable for motor vehicle power mechanism, I do not wish to be understood as thereby limiting myself to such particular structure since the invention is applicable to cone clutches generally.

Numerous changes may obviously be made in the described modification. For instance, another form of reinforceing ring can be used and either inside or outside of the cone. Also the driving cone may, in certain instances, be composed of sheet metal which will require strengthening as has been done here. All these and other obvious changes are comprehended by my invention, the scope of which is defined by what is claimed.

What is claimed is:

1. In power transmitting mechanism in combination, a driving member, a driven cone engageable therewith for receiving and transmitting power therefrom, the said driven cone being formed of readily deformable metal and provided with a substantially rigid, reinforcing annular member secured to its peripherey.

2. In a power transmitting mechanism in combination, a driving member, a driven cone normally engaging therewith, the said driven cone being formed of sheet metal and having a substantially rigid reinforcing ring secured thereto, means for retracting the driven cone from engagement with the driving cone, and brake means actuated simultaneously with the aforesaid means for engaging the said reinforcing ring when the driven cone is in retracted position.

3. In a power transmitting mechanism in combination, a driving cone, a driven cone engageable therewith, the driven cone being formed of sheet metal with a peripherally located reinforcing ring secured thereto, means for retracting the said driven cone from engagement with the driving cone, and a brake engageable with the said ring when the driven cone is in retracted position.

4. In a power transmitting mechanism in combination, a driving cone, a driven cone engageable therewith, the driven cone being formed of sheet metal and having secured to its periphery a reinforcing ring comprising an inwardly extending flange, means for retracting the driven cone from engagement with the driving cone, a brake engageable with the said flange when the said driven cone is in a retracted position and a tension spring secured to the said brake.

5. As a new article of manufacture, a sheet metal clutch cone having a substantially rigid reinforcing ring secured to the periphery thereof.

In testimony whereof I affix my signature.

MARTIN B. COVERT.